(12) United States Patent
Snyder et al.

(10) Patent No.: US 11,103,778 B1
(45) Date of Patent: Aug. 31, 2021

(54) MULTI-LEVEL LIGHTING SYSTEM

(71) Applicant: KABAM, INC., San Francisco, CA (US)

(72) Inventors: Cody Snyder, San Francisco, CA (US); Russell Warneboldt, San Francisco, CA (US)

(73) Assignee: Kabam, Inc., San Francisco, CA (US)

(*) Notice: Subject to any disclaimer, the term of this patent is extended or adjusted under 35 U.S.C. 154(b) by 395 days.

(21) Appl. No.: 15/471,596

(22) Filed: Mar. 28, 2017

(51) Int. Cl.
*A63F 13/355* (2014.01)

(52) U.S. Cl.
CPC ...... *A63F 13/355* (2014.09); *A63F 2300/538* (2013.01)

(58) Field of Classification Search
CPC .................................................. A63F 13/355
See application file for complete search history.

(56) References Cited

U.S. PATENT DOCUMENTS

| | | | |
|---|---|---|---|
| 7,548,238 B2 | 6/2009 | Berteig | |
| 9,330,492 B2 | 5/2016 | Tokuyoshi | |
| 10,193,999 B1* | 1/2019 | Howell | A63F 13/355 |
| 2007/0018980 A1* | 1/2007 | Berteig | G06T 15/80 |
| | | | 345/426 |
| 2008/0143720 A1* | 6/2008 | Elmquist | G06T 15/50 |
| | | | 345/426 |
| 2014/0280504 A1* | 9/2014 | Cronin | A63F 13/63 |
| | | | 709/203 |
| 2014/0327690 A1 | 11/2014 | McGuire | |
| 2015/0011277 A1* | 1/2015 | Wakeford | A63F 13/00 |
| | | | 463/1 |
| 2015/0348315 A1 | 12/2015 | Wang | |
| 2016/0038835 A1* | 2/2016 | DeLaet | A63F 13/12 |
| | | | 463/29 |
| 2016/0292810 A1* | 10/2016 | Fine | G06F 9/50 |
| 2017/0249778 A1* | 8/2017 | Laurent | G06T 15/005 |
| 2017/0311415 A1* | 10/2017 | Rozendaal | A63F 13/235 |
| 2018/0236354 A1* | 8/2018 | Van Boven | H05B 47/155 |
| 2019/0099668 A1* | 4/2019 | Aliakseyeu | G06F 16/48 |

OTHER PUBLICATIONS

Lambert, Matthew, "Battlefield 4 Performance Analysis," Nov. 27, 2013, available at https://bit-tech.net/reviews/tech/graphics/battlefield-4-performance-analysis/1/ (Year: 2013).*

* cited by examiner

*Primary Examiner* — Jay Trent Liddle
(74) *Attorney, Agent, or Firm* — Esplin & Associates, PC

(57) ABSTRACT

A system and method for facilitating lighting of objects during interactive gameplay by users on client computing platforms distinguishes activities performed prior to interactive gameplay and during interactive gameplay. Different client computing platforms may have different levels of graphics performance. Lighting may be defined by characteristics of one or more light sources that illuminate one or more objects in a multi-dimensional volume in a virtual space. Different lighting techniques or lighting features may be combined to create lighting during interactive gameplay. Some lighting techniques or lighting features may only be available and/or supported on high-performance computing platforms, whereas other lighting features may be available even on low-performance computing platforms.

18 Claims, 4 Drawing Sheets

MULTI-LEVEL LIGHTING SYSTEM

FIELD OF THE DISCLOSURE

This disclosure relates to facilitating lighting of objects during interactive gameplay.

BACKGROUND

Systems that facilitate lighting of objects during interactive gameplay by users on client computing platforms are limited to the available performance on a computing platform or device. Certain lighting techniques may require more computing power than is available in real-time. For example, a video sequence in a game or movie may take minutes or hours to render per frame. The same level of detail and/or the same lighting techniques may not be available during interactive gameplay, in which the viewpoint may change due to a user's input. In particular, viewpoint changes may be unpredictable, such that a new image may need to be created in response to a viewpoint change.

Developers of interactive media content, e.g. game developers, may target a particular client computing platform having known graphics capabilities and/or known computing power. In some case, game developers may target different types of client computing platforms, such that the targeted platforms may be distinguished in two, three, or more levels. For example, a particular video game may be targeted to both a particular high-end client computing platform having state-of-the-art graphics capabilities and industry-leading amounts of computing power, as well as a low-end client computing platform having less advanced graphics capabilities and a modest amount of computing power. For example, the high-end platform may be the latest PlayStation™ and the low-end platform may be an outdated Android™ smartphone. To target both platforms for a new video game, game developers may decide on a first set of lighting features for the high-end platform and a second set of lighting features for the low-end platform.

SUMMARY

One aspect of the disclosure relates to facilitating lighting of objects during interactive gameplay by users on client computing platforms. Lighting may be defined by characteristics of one or more light sources that illuminate one or more objects in a virtual space, e.g., in a three-dimensional volume in the virtual space. The systems and methods disclosed herein distinguish activities performed prior to interactive gameplay (also referred to as pre-processing) and during interactive gameplay (also referred to as runtime or real-time processing).

In some implementations, a system configured to facilitate lighting of objects during interactive gameplay may include one or more servers, one or more processors, electronic storage, one or more networks, one or more client computing platforms, one or more external resources, and/or other components. As used herein, the term "processor" is used interchangeably with the term "physical processor." The one or more processors may be configured by instructions to execute and/or implement one or more computer program components. The computer program components may include one or more of a space component, a lighting preprocessing component, a support component, a selection component, a runtime lighting component, and/or other components.

The space component may be configured to execute an instance of a virtual space. The space component may implement the instance of the virtual space to facilitate participation by users in the virtual space. The virtual space may include one or more of a two-dimensional space, a three-dimensional space, and/or other virtual space. The instance of the virtual space may include virtual space content determined based on individual virtual space content associated with individual objects and the arrangement(s) of the objects, and/or other information. The space component may use the instance of the virtual space to facilitate presentation of one or more views of the virtual space to a user. The space component may use the instance of the virtual space to enable a user to interact with the virtual space. In some implementations, the execution of the instance of the virtual space may include the space component executing an instance of a game within the virtual space.

The space component may be configured to receive user requests to initiate actions at locations within the virtual space. A user request to initiate an action in the virtual space may specify an action type associated with the requested action. The action type may be used to obtain a function, method, routine, formula, software component or components, and/or any other means that may be used to execute the requested action. Examples of an action type may include, but not limited to, moving, turning, defending, attacking, mining, logging, farming, managing, surveying, training, researching, constructing, recruiting and/or any other action types appropriate for the virtual space. A user request to initiate an action may also specify one or more virtual space objects and/or characters to be acted on, for example, specific buildings (e.g., farm, bank, barrack, mill, lumber yard, etc.), resources (e.g., iron, gold, oil, coal, etc.), troop, knights and so on.

The space component may be configured to execute user requested actions at virtual space locations in an instance of the virtual space. The virtual space locations may include, but not limited to, areas designated as a city, realm, kingdom, state, nation, culture or the like, tiles for improvements (e.g., resource tiles that may be mined, food tiles that may be farmed, land tile that may be used to construct buildings, etc.), topology (e.g., road, hill, ocean, desert, lake, swamp, etc.), and/or any other locations appropriate for the virtual space.

The space component may be configured to receive user requests to participate in activities in the virtual space and execute those activities. The user requested activities may include, but is not limited to, initiating virtual space transactions (e.g., buying or selling virtual items, ordering services provided by the virtual space, and/or any other virtual space transactions), partaking in a game, mission, quest, campaign, expedition, training, tutorial, research and/or so on in the virtual space, consulting a virtual space expert (e.g., asking virtual consultants questions about performing diplomacy in the virtual space), messaging other users (e.g., texting, text chatting, voice chatting, etc.), convening (e.g., conducting an alliance meeting, voting in an alliance meeting, etc.), and/or any other virtual space activities.

The lighting preprocessing component may be configured to determine and/or generate sets of lighting information. Operations by the lighting preprocessing component may be performed, substantially or completely, prior to interactive gameplay. In some implementations, sets of lighting information may define lighting by one or more light sources of objects in a three-dimensional volume. In some implementations, the three-dimensional volume may be part of a virtual space. In some implementations, sets of lighting information may define lighting by one or more light sources of objects in a virtual space. In some implementations, lighting information may include light models, light maps, and/or other information that may be used to facilitate lighting. In some implementations, sets of lighting information may correspond to sets of supported lighting techniques and/or lighting features. For example, a first set of lighting information may define lighting for a first type of client computing platforms, a second set of lighting information may define lighting for a second type of client computing platforms, a third set of lighting information may define lighting for a third type of client computing platforms, and so forth. For example, the first type of client computing platforms may represent state-of-the-art graphics capabilities and industry-leading amounts of computing power, a third type of client computing platforms may represent less advanced graphics capabilities (compared to the first type) and a modest amount of computing power (e.g., less than the first type), and a second type of client computing platforms may represent graphics capabilities and computing power at a level between the first and third types of client computing platforms. As used herein, the first type of client computing platforms may be referred to as high-end platforms, the second type may be referred to as mid-range platforms, and the third type may be referred to as low-end platforms. Compared to high-end platforms, the other platforms may be referred to as lower-end platforms. Compared to the low-end platforms, the other platforms may be referred to as higher-end platforms.

In some implementations, the lighting preprocessing component may be configured to determine and/or generate a first set of lighting information for high-end platforms, a second set of lighting information for mid-range platforms, and a third set of lighting information for low-end platforms. A set of lighting information may define lighting in accordance with a particular primary set of lighting techniques and/or lighting features being implemented during interactive gameplay and a particular secondary set of lighting techniques and/or lighting features being implemented prior to interactive gameplay. In some implementations, each different level of client computing platform may be associated with a corresponding pair of a primary and a secondary set of lighting techniques and/or lighting features. For the highest level of capabilities and computing power, the secondary set may be empty. For the lowest level of capabilities and computing power, the primary set may be empty. For many platforms, including but not limited to mid-range platforms, both the primary and secondary set may include at least one lighting technique and/or lighting feature. For example, certain types of lighting by a static light source on a (directly exposed) static object may be so similar or the same between different frames that recreating this particular illumination effect on a frame-by-frame basis may be wasteful of computing resources. For example, certain types of lighting by a dynamic light source on a dynamic object (e.g., reflections off fast-flying objects) may be so dissimilar between different frames that recreating this particular illumination effect on a frame-by-frame basis may be required to obtain the effect at all.

Lower-end platforms may omit certain types of lighting if neither real-time processing nor pre-processing is available or feasible. Lighting techniques and lighting features that are not supported in any way on a particular client computing platform may also be referred to as belonging to a tertiary set of lighting techniques and/or lighting features. Types of lighting in a tertiary set may need to be omitted. The tertiary set of a low-end platform may be more extensive than the tertiary set of a higher-end platform.

In some implementations, a lighting technique and/or lighting feature in a secondary set (of a lower-end platform) may approximate and/or mimic the illumination of a particular lighting technique and/or lighting feature that is included in a primary set of a higher-end platform. The primary set may be referred to as the runtime set or real-time set. The secondary set may be referred to as pre-processed set, preconfigured set, or "baked-in" set. The primary set for high-end platforms may include lighting techniques and/or lighting features that are not supported (and/or at least not supported in the primary set) by lower-end platforms. The primary set for mid-range platforms may include lighting techniques and/or lighting features that are not supported (and/or at least not supported in the primary set) by low-end platforms.

For example, a static light source may indirectly illuminate a particular surface of a static object within a three-dimensional volume that is part of a video game. This type of lighting may be referred to as indirect lighting. If a particular higher-end client computing platform supports a real-time implementation during interactive gameplay of this type of lighting (e.g., recreate the lighting on the particular surface for every frame or every set of frames, e.g., by ray-tracing) the lighting preprocessing component may include the pertinent information regarding the static light source, the static object, the particular surface, the lighting model used to determine this particular illumination, and/or any other information required for the particular higher-end client computing platform to implement this type of lighting during interactive gameplay in the first set of lighting information. In this case, this particular type of lighting is included in the primary set. In some implementations, a lower-end client computing platform may not support this type of lighting during interactive gameplay. In some implementations, the effects of this type of lighting on the particular surface may be determined prior to interactive gameplay and "baked" into a light map, e.g. by assigning particular colors and/or brightness to pixels, vertices, and/or other elements used to draw the particular surface. The lower-end client computing platform may be configured to use the (pre-processed) light map (and/or the information included in a set of lighting information) to implement lighting, in particular the effects of this type of lighting, during interactive gameplay. In this case, this particular type of lighting is included in a secondary set. In some implementations, types of lighting in the secondary set may be reused between different frames, in particular if the particular illumination is similar or the same between different frames.

By way of non-limiting example, a static object (e.g. a streetlamp) between a static light source (e.g., the sun) and a static surface (e.g. the side of a building) may cast a shadow on the static surface that remains the same or similar between subsequent frames. A higher-end platform may determine and re-determine this shadow during interactive gameplay. However, a lower-end platform may approximate and/or mimic this particular illumination (i.e., the casting of this shadow) by using a light map with the shadow being baked-in, thus saving the effort to determine and re-determine this particular illumination. In some implementations, a very low level low-end platform may entirely omit this type of lighting feature.

By way of non-limiting example, certain types of light sources may have a localized effect. For example, lighting provided by a (small) burning fire may only affect the illumination of a relatively small number of pixels, vertices, surfaces, objects, and/or otherwise visible elements that contribute to a view of the virtual space and/or the three-dimensional volume. In some implementations, lighting from these certain types of light sources may be referred to as deferred lighting. In some implementations, deferred lighting may be defined as lighting that contributes to less than a certain percentage of the number of pixels, vertices, surfaces, objects, and/or otherwise visible elements that contribute to a view of the virtual space and/or the three-dimensional volume. In some implementations, the certain percentage may be 50%, 40%, 30%, 25%, 20%, 15%, 10% and/or another percentage. In some implementations, deferred lighting may be defined as lighting from one or more dynamic light sources. In some implementations, dynamic light sources may include fires, flashlights, reflections, specular highlights, spinning lights, flashing lights, and/or other light sources. In some implementations, static light sources may include the sun, the moon, starts, spotlights, and/or other light sources that move and/or change little or not at all between subsequent frames.

Sets of lighting information may be stored in electronic storage. For example, the lighting preprocessing component may be configured to store information in electronic storage. Components of the system may obtain, retrieve, and/or otherwise access the set of lighting information to implement and/or determine lighting, in particular during interactive gameplay.

The support component may be configured to obtain and/or determine lighting techniques and/or lighting features that are supported by a particular client computing platform. In some implementations, the support component may be configured to obtain and/or determine lighting techniques and/or lighting features that are supported by a particular type of client computing platform (e.g., the latest version of iPhone™). The support component may be configured to determine sets of supported lighting techniques and/or lighting features. For example, the support component may be configured to determine a primary set of lighting techniques and/or lighting features that are supported during interactive gameplay on a particular client computing platform. For example, the support component may be configured to determine a secondary set of lighting techniques and/or lighting features that are supported prior to interactive gameplay on a particular client computing platform (but, e.g., that are not supported during interactive gameplay), or vice versa. For example, the support component may be configured to determine a set of lighting techniques and/or lighting features that are not supported in any way on a particular client computing platform (which may be referred to as a tertiary set).

The selection component may be configured to select sets of lighting information for client computing platforms. For example, the selection component may be configured to analyze and/or compare lighting techniques and/or lighting features that are supported by a particular client computing platform (e.g. as obtained and/or determined by the support component). In some implementations, the selection component may be configured to analyze and/or compare lighting techniques and/or lighting features that are supported by a particular type of client computing platform (e.g. as obtained and/or determined by the support component).

The selection component may be configured to select at least one set of lighting information that has been determined and/or generated by the lighting pre-processing component. In other words, the selection component may be configured to determine which set of lighting information is most suitable for a particular client computing platform and/or a particular type of client computing platform. In some implementations, selection by the selection component may be based on an analysis and/or comparison of a primary set of lighting techniques and/or lighting features. In some implementations, selection by the selection component may be based on an analysis and/or comparison of a secondary set of lighting techniques and/or lighting features. In some implementations, selection by the selection component may be based on an analysis and/or comparison of a primary set and a secondary set of lighting techniques and/or lighting features.

The runtime lighting component may be configured to determine lighting. For example, the runtime lighting component may be configured to determine lighting of objects in the virtual space. For example, the runtime lighting component may be configured to determine lighting of objects in the three-dimensional volume. In particular, the runtime lighting component may determine lighting for a particular client computing platform. In some implementations, the runtime lighting component may be configured to determine lighting during interactive gameplay. In some implementations, the runtime lighting component may operate in conjunction with the space component. In some implementations, the runtime lighting component may be configured to determine lighting in accordance with one or more sets of lighting information that have been selected by the selection component. In some implementations, the runtime lighting component may be configured to determine lighting in accordance with one or more sets of lighting techniques and/or lighting features that have been selected by the selection component. For example, the runtime lighting component may be configured to determine lighting based on a primary set of lighting techniques and/or lighting features. Alternatively, and/or simultaneously, the runtime lighting component may be configured to determine lighting based on a secondary set of lighting techniques and/or lighting features. The runtime lighting component may be configured to obtain and/or otherwise access sets of lighting information from electronic storage. In particular, the runtime lighting component may obtain and/or access the one or more sets of lighting information that have been selected by the selection component.

As used herein, any association (or relation, or reflection, or indication, or correspondency) involving light sources, objects, lighting techniques, lighting features, sets of lighting information, light maps, surfaces, pixels, vertices, parameters, thresholds, functions, vectors, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
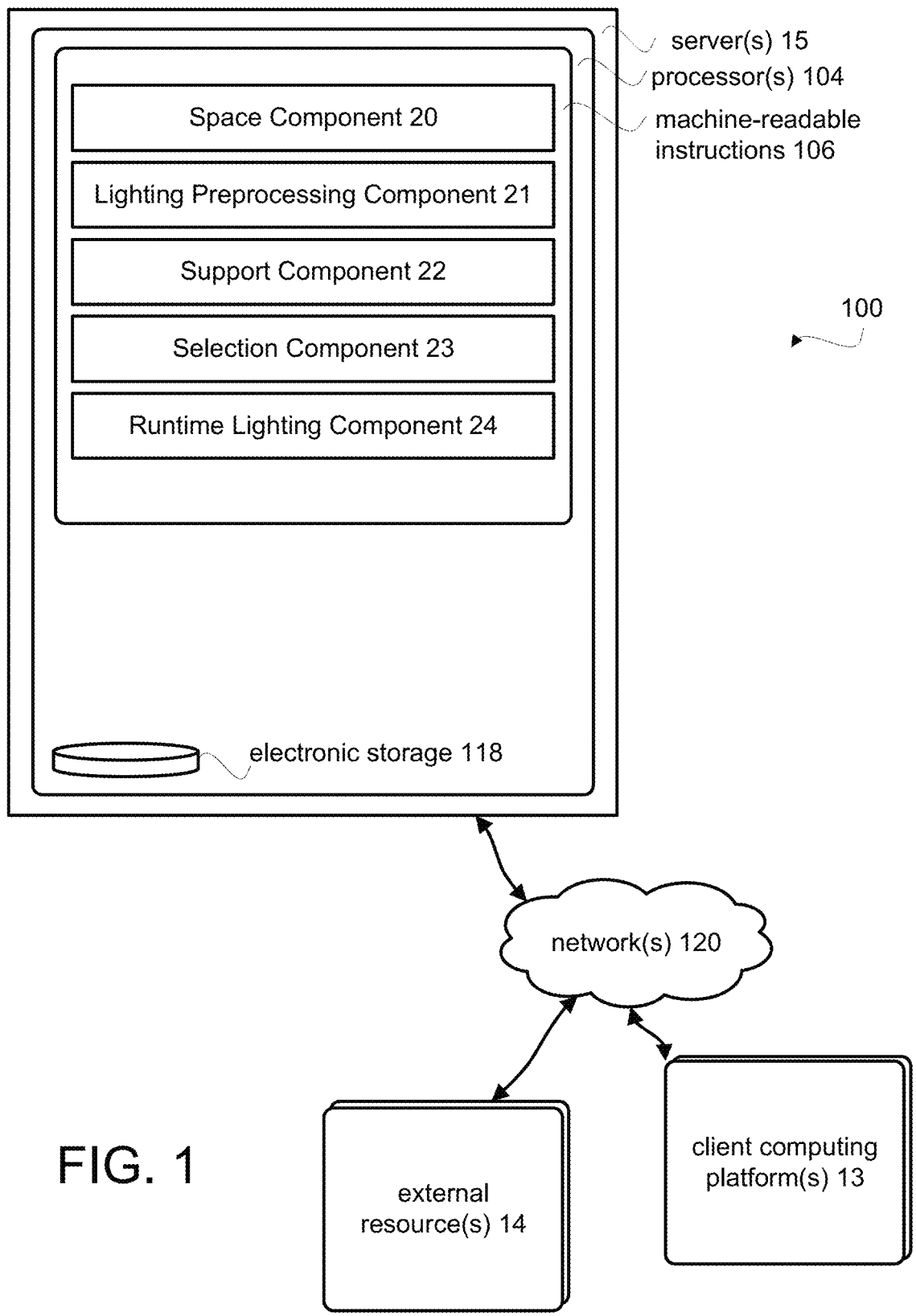
FIG. 1 illustrates an exemplary system configured to facilitate lighting of objects during interactive gameplay, in accordance with one or more implementations.

FIG. 1 illustrates a system 100 configured to facilitate lighting of objects during interactive gameplay by users on client computing platforms. System 100 may include one or more servers 15, one or more processors 104, electronic storage 118, one or more networks 120, one or more client computing platforms 13, one or more external resources 14, and/or other components. Server 15 may be configured to communicate with one or more client computing platforms 13 according to a client/server architecture. Users may access system 100 and/or the virtual space via client computing platforms 13. As used herein, the term "gameplay" refers to use by one or more users of one or more virtual spaces through one or more client computing platforms 13, and does not limit the use to games. As used herein, the phrase "multi-user gameplay" refers to use by multiple users of one or more virtual spaces through multiple client computing platforms 13, and does not limit the use to games. In some implementations, individual ones of the multiple client computing platforms may correspond to individual ones of the multiple users.

Server 15 and/or processors 104 may be configured to execute one or more computer program components. The one or more computer program components may include one or more of a space component 20, a lighting preprocessing component 21, a support component 22, a selection component 23, a runtime lighting component 24, and/or other components.

In some implementations, the functionality attributed to one or more components may be performed by different computing platforms, e.g. remote from other components. For example, functionality attributed to space component 20 and support component 22 may be performed by a server (e.g., an interactive server, a server used at runtime, and/or a server used during gameplay) and/or a client computing platform. Functionality attributed to lighting preprocessing component 21 may be performed by a different server and/or an offline server. Functionality attributed to lighting preprocessing component 21 may be performed prior to gameplay and/or not at runtime. Functionality attributed to selection component 23 and runtime lighting component 24 may be performed by client computing platforms, e.g., at runtime and/or during gameplay. In some implementations, the functionality attributed to one or more components may be performed at different times, e.g., by offline servers and/or prior to gameplay and/or not at runtime.

System 100 may be configured to manage one or more user accounts, user profiles, and/or user information associated with users of the system 100. The one or more user accounts, user profiles, and/or user information may include information stored by server 15, one or more of client computing platforms 13, and/or other storage locations.

Space component 20 may be configured to execute an instance of a virtual space. Space component 20 may implement the instance of the virtual space to facilitate participation by users in the virtual space. The virtual space may include one or more of a multi-dimensional space, a two-dimensional space, a three-dimensional space, and/or other virtual space. The instance of the virtual space may include virtual space content determined based on individual virtual space content associated with individual objects and the arrangement(s) of the objects, and/or other information. Space component 20 may use the instance of the virtual space to facilitate presentation of one or more views of the virtual space to a user. Space component 20 may use the instance of the virtual space to enable a user to interact with the virtual space. In some implementations, the execution of the instance of the virtual space may include space component 20 executing an instance of a game within the virtual space.

Figure 2A:
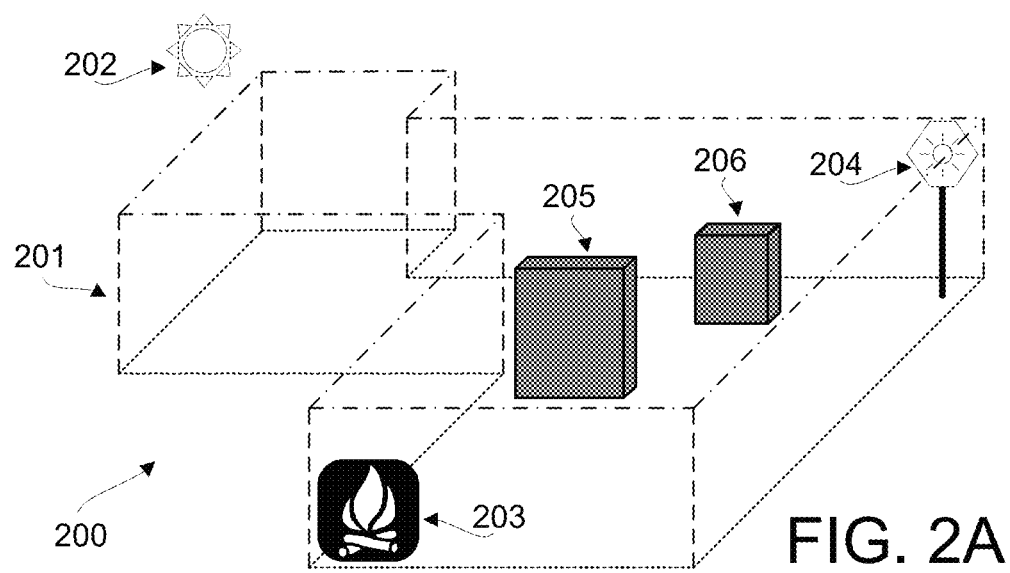
FIGS. 2A-2B-2C-2D illustrate depictions of virtual spaces that may be used by a system configured to facilitate lighting of objects during interactive gameplay, in accordance with one or more implementations.

By way of non-limiting example, FIG. 2A illustrates a depiction 200 of a virtual space that may be used by a system configured to facilitate lighting of objects during interactive gameplay. The virtual space may include a multi-dimensional volume 201 bounded by multiple walls, light sources 202, 203, and 204, objects 205 and 206, and/or other objects. Light sources 202, 203, and 204 may be different types of light sources, and may provide different types of lighting. For example, light source 202 may be a static light source, similar to the sun. Light source 203 may be a dynamic light source, similar to a camp fire. Light source 204 may be in a static position that is not moved, similar to a lamppost, and may be turned on and/or off. Other types of light sources, having other combinations of static and dynamic features, may be supported. Objects 205 and 206 may be different types of objects, and may have different lighting characteristics responsive to being lit. Object 205 may be a static object, similar to a building. Object 206 may be a dynamic object, similar to a car. Other types of objects, having other combinations of static and dynamic features, may be supported.

Referring to FIG. 1, space component 20 may be configured to receive user requests to initiate actions at locations within the virtual space. A user request to initiate an action in the virtual space may specify an action type associated with the requested action. The action type may be used to obtain a function, method, routine, formula, software component or components, and/or any other means that may be used to execute the requested action. A user request to initiate an action may also specify one or more virtual space objects and/or characters to be acted on.

Space component 20 may be configured to execute user requested actions at virtual space locations in an instance of the virtual space. The virtual space locations may include, but not limited to, areas and/or locations appropriate for the virtual space.

Space component 20 may be configured to receive user requests to participate in activities in the virtual space and execute those activities. The user requested activities may include, but is not limited to, initiating virtual space transactions, partaking in a game, mission, quest, campaign, expedition, training, tutorial, research and/or so on in the virtual space, consulting a virtual space expert, messaging other users, convening, and/or any other virtual space activities.

The disclosure of the virtual space determined from the instance executed by space component 20 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space component 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands provided by the users through client computing platforms 13. The control inputs and/or commands provided by the user may specify an action involving controlled elements at a virtual space location. Such a user-initiated action in the virtual space may change the state of the virtual space at an instance when the action is executed in the virtual space. Such a user-initiated action in the virtual space may change views of the virtual space when the action is executed in the virtual space.

The users may interact with each other through communications exchanged within the virtual space. Such communications may include one or more of textual chat, instant messages, private messages, voice communications, and/or other communications. Communications may be received and entered by the users via their respective client computing platforms 13. Communications may be routed to and from the appropriate users through server 15 (e.g., through space component 20).

Client computing platforms 13 may include multiple types of client computing platforms, e.g. a first type of client computing platforms, a second type of client computing platforms, a third type of client computing platforms, and so forth. Different types of client computing platform may have different levels of available performance (e.g., computing power, graphics performance, memory speed, bandwidth, etc.). In some implementations, different users with different types of client computing platforms 13 may interact in the same virtual space.

Different lighting techniques and/or lighting features may be supported by different (types of) client computing platforms. In some implementations, a particular supported lighting technique or feature may be implemented during interactive multi-user gameplay, e.g. through ray-tracing. In some implementations, the same particular supported lighting technique or feature may be implemented prior to interactive gameplay, e.g. by including particular information in a light map. In some implementations, a particular type of client computing platform may be unable to support a particular lighting technique or feature. In some implementations, a particular user may turn off a particular lighting technique or feature, e.g. to improve framerate and/or resolution.

Lighting preprocessing component 21 may be configured to determine and/or generate sets of lighting information. Operations by lighting preprocessing component 21 may be performed, substantially or completely, prior to interactive gameplay. In some implementations, operations by lighting preprocessing component 21 may be performed prior to interactive multi-user gameplay. In some implementations, sets of lighting information may define lighting by one or more light sources of objects in a multi-dimensional volume. In some implementations, the multi-dimensional volume may be part of a virtual space. In some implementations, sets of lighting information may define lighting by one or more light sources of objects in a virtual space. In some implementations, lighting information may include light models, light maps, and/or other information that may be used to facilitate lighting. In some implementations, lighting information may facilitate lighting during and/or prior to interactive gameplay.

In some implementations, sets of lighting information may correspond to sets of supported lighting techniques and/or lighting features. Individual lighting techniques and/or lighting features may be implemented prior to interactive gameplay or during interactive gameplay. In some implementations, a particular lighting technique or feature may be partially implemented prior to interactive gameplay and partially implemented during interactive gameplay.

A first set of lighting information may define lighting for a first type of client computing platforms, a second set of lighting information may define lighting for a second type of client computing platforms, a third set of lighting information may define lighting for a third type of client computing platforms, and so forth. For example, the first type of client computing platforms may represent state-of-the-art graphics capabilities and industry-leading amounts of computing power, a third type of client computing platforms may represent less advanced graphics capabilities (compared to the first type) and a modest amount of computing power (e.g., less than the first type), and a second type of client computing platforms may represent graphics capabilities and computing power at a level between the first and third types of client computing platforms. As used herein, the first type of client computing platforms may be referred to as high-end platforms, the second type may be referred to as mid-range platforms, and the third type may be referred to as low-end platforms. Compared to high-end platforms, the other platforms may be referred to as lower-end platforms.

Compared to the low-end platforms, the other platforms may be referred to as higher-end platforms.

In some implementations, lighting preprocessing component 21 may be configured to determine and/or generate a first set of lighting information for high-end platforms, a second set of lighting information for mid-range platforms, and a third set of lighting information for low-end platforms. A set of lighting information may define lighting in accordance with a particular primary set of lighting techniques and/or lighting features being implemented during interactive gameplay and a particular secondary set of lighting techniques and/or lighting features being implemented prior to interactive gameplay. In some implementations, each different level of client computing platform may be associated with a corresponding pair of a primary and a secondary set of lighting techniques and/or lighting features. For the highest level of capabilities and computing power, the secondary set may be empty. For the lowest level of capabilities and computing power, the primary set may be empty. For many platforms, including but not limited to mid-range platforms, both the primary and secondary set may include at least one lighting technique and/or lighting feature. For example, certain types of lighting by a static light source on a (directly exposed) static object may be so similar or the same between different frames that recreating this particular illumination effect on a frame-by-frame basis may be wasteful of computing resources. As a result, such lighting techniques and/or lighting features may be more suitably included in a secondary set rather than a primary set, at least for lower-end client computing platforms. For example, certain types of lighting by a dynamic light source on a dynamic object (e.g., reflections off fast-flying objects) may be so dissimilar between different frames that recreating this particular illumination effect on a frame-by-frame basis may be required to obtain the effect at all. As a result, such lighting techniques and/or lighting features may be more suitably included in a primary set rather than a secondary set, at least for higher-end client computing platforms that support that particular lighting technique or feature.

Lower-end platforms may omit certain types of lighting if neither real-time processing nor pre-processing is available or feasible. Lighting techniques and lighting features that are not supported in any way on a particular client computing platform (and/or turned off by the user) may also be referred to as belonging to a tertiary set of lighting techniques and/or lighting features. Types of lighting in a tertiary set may need to be omitted. The tertiary set of a low-end platform may be more extensive than the tertiary set of a higher-end platform. The tertiary set of a low-end platform may include more lighting techniques and/or lighting features than the tertiary set of a higher-end platform.

In some implementations, a lighting technique and/or lighting feature in a secondary set (of a lower-end platform) may approximate and/or mimic the illumination of a particular lighting technique and/or lighting feature that is included in a primary set of a higher-end platform. The primary set may be referred to as the runtime set or real-time set. The secondary set may be referred to as pre-processed set, preconfigured set, or "baked-in" set. The primary set for high-end platforms may include lighting techniques and/or lighting features that are not supported (and/or at least not supported in the primary set) by lower-end platforms. The primary set for mid-range platforms may include lighting techniques and/or lighting features that are not supported (and/or at least not supported in the primary set) by low-end platforms.

For example, a static light source may indirectly illuminate a particular surface of a static object within a three-dimensional volume that is part of a video game. This type of lighting may be referred to as indirect lighting. If a particular higher-end client computing platform supports a real-time implementation during interactive gameplay (in particular interactive multi-user gameplay) of this type of lighting (e.g., recreate the lighting on the particular surface for every frame or every set of frames, e.g., by ray-tracing) lighting preprocessing component 21 may include the pertinent information regarding the static light source, the static object, the particular surface, the lighting model used to determine this particular illumination, and/or any other information required for the particular higher-end client computing platform to implement this type of lighting during interactive gameplay in the first set of lighting information. In this case, this particular type of lighting is included in the primary set. In some implementations, a lower-end client computing platform may not support this type of lighting during interactive gameplay. In some implementations, the effects of this type of lighting on the particular surface may be determined prior to interactive gameplay and "baked" into a light map, e.g. by assigning particular colors and/or brightness to pixels, vertices, and/or other elements used to draw the particular surface. The lower-end client computing platform may be configured to use the (pre-processed) light map (and/or the information included in a set of lighting information) to implement lighting, in particular the effects of this type of lighting, during interactive gameplay. In this case, this particular type of lighting is included in a secondary set. In some implementations, types of lighting in the secondary set may be reused between different frames, in particular if the particular illumination is similar or the same between different frames.

By way of non-limiting example, a static object (e.g. a streetlamp) between a static light source (e.g., the sun) and a static surface (e.g. the side of a building) may cast a shadow on the static surface that remains the same or similar between subsequent frames. A higher-end platform may determine and re-determine this shadow during interactive gameplay. However, a lower-end platform may approximate and/or mimic this particular illumination (i.e., the casting of this shadow) by using a light map with the shadow being baked-in, thus saving the effort to determine and re-determine this particular illumination. In some implementations, a very low level low-end platform may entirely omit this type of lighting feature.

By way of non-limiting example, certain types of light sources may have a localized effect. For example, lighting provided by a (small) burning fire may only affect the illumination of a relatively small number of pixels, vertices, surfaces, objects, and/or otherwise visible elements that contribute to a view of the virtual space and/or the three-dimensional volume. In some implementations, lighting from these certain types of light sources may be referred to as deferred lighting. In some implementations, deferred lighting may be defined as lighting that contributes to less than a certain percentage of the number of pixels, vertices, surfaces, objects, and/or otherwise visible elements that contribute to a view of the virtual space and/or the three-dimensional volume. In some implementations, the certain percentage may be 50%, 40%, 30%, 25%, 20%, 15%, 10% and/or another percentage. In some implementations, deferred lighting may be defined as lighting from one or more dynamic light sources. In some implementations, dynamic light sources may include fires, flashlights, reflections, specular highlights, spinning lights, flashing lights, and/or other light sources. In some implementations, static light sources may include the sun, the moon, starts, spotlights, and/or other light sources that move and/or change little or not at all between subsequent frames.

Figure 2B:
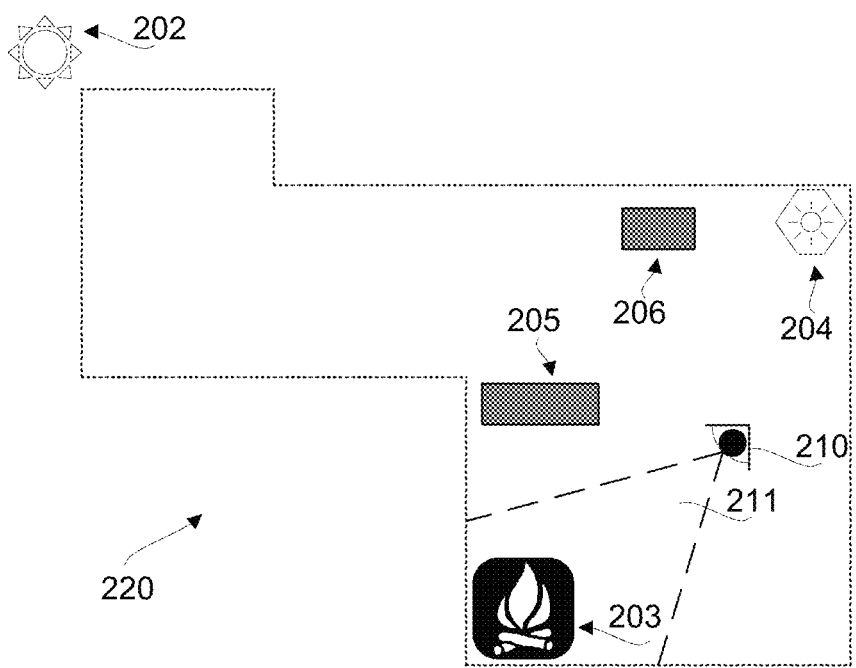

By way of non-limiting example, FIG. 2B illustrates a top-view 220 of a virtual space that may be used by a system configured to facilitate lighting of objects during interactive gameplay. The virtual space may be the same as or similar to the virtual space depicted in FIG. 2A. Top-view 220 depicts a viewpoint 210 that represents the location of a camera or eye, and a viewing area 211, illustrated by a cone or triangle originating from viewpoint 210. Viewing area 211 represents a section of top-view 220 that is visible from viewpoint 210 at a particular moment. Dynamic light source 203 is included in viewing area 211. In some implementations, lighting from light source 203 may be referred to as deferred lighting. In higher-end client computing platforms, light source 203 may cast flickering shadows on objects and/or walls within viewing area 211. In lower-end client computing platforms, light source 203 may cast static shadows or no shadows at all on objects and/or walls within viewing area 211.

Figure 2C:
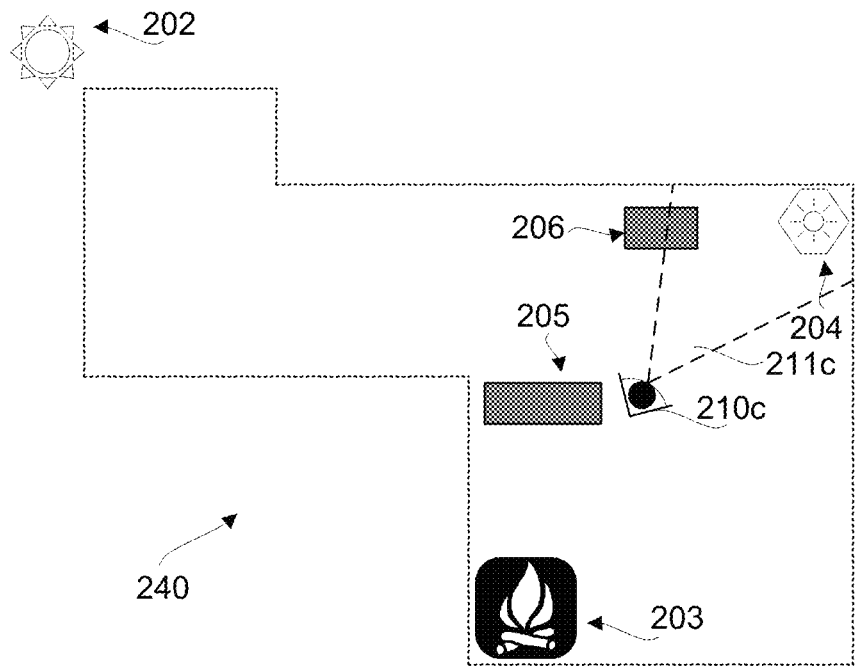

By way of non-limiting example, FIG. 2C illustrates a top-view 240 of a virtual space that may be used by a system configured to facilitate lighting of objects during interactive gameplay. The virtual space may be the same as or similar to the virtual space depicted in FIG. 2A. Top-view 240 depicts a viewpoint 210c that represents the location of a camera or eye, and a viewing area 211c, illustrated by a cone or triangle originating from viewpoint 210c. Viewing area 211c represents a section of top-view 240 that is visible from viewpoint 210c at a particular moment. Light source 204 is included in viewing area 211c. In higher-end client computing platforms, light source 203 may create a particular illumination effect on a particular surface of object 206 within viewing area 211. In lower-end client computing platforms, the same illumination effect and/or a similar illumination effect may be approximated and/or mimicked, e.g. by including particular information in a light map. In some implementations, a very low level low-end platform may entirely omit this particular illumination effect.

Figure 2D:
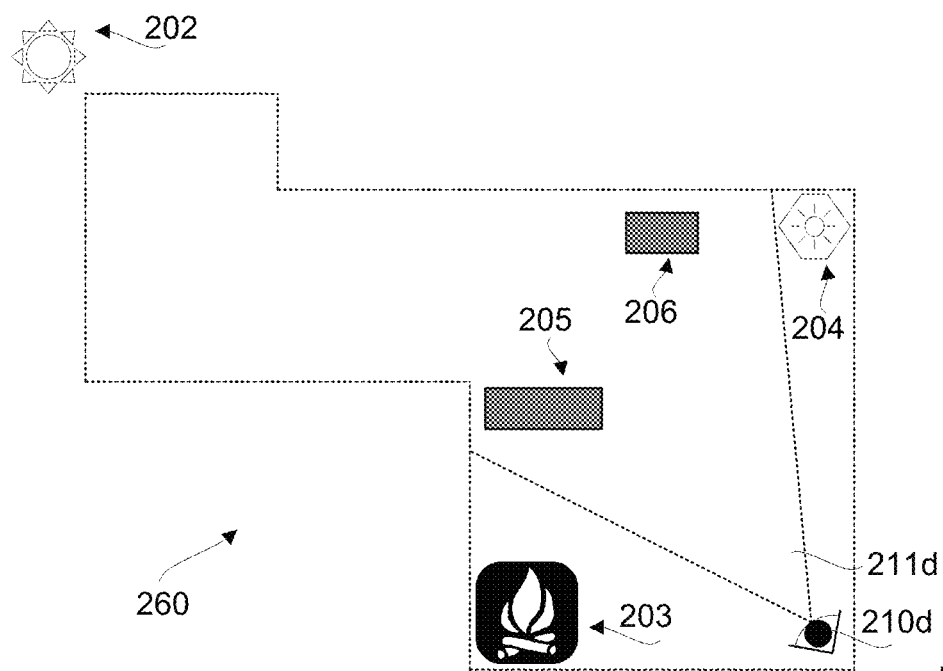

By way of non-limiting example, FIG. 2D illustrates a top-view 260 of a virtual space that may be used by a system configured to facilitate lighting of objects during interactive gameplay. The virtual space may be the same as or similar to the virtual space depicted in FIG. 2A. Top-view 260 depicts a viewpoint 210d that represents the location of a camera or eye, and a viewing area 211d, illustrated by a cone or triangle originating from viewpoint 210d. Viewing area 211d represents a section of top-view 260 that is visible from viewpoint 210d at a particular moment. Light source 202 is included in viewing area 211d, and may provide lighting of objects within viewing area 211d, including but not limited to object 205 and object 206. Light source 203 is not included in viewing area 211d. Depending on the type of client computing platform used, one or more particular illumination effects due to light source 203 may be supported or not supported, and if supported, implemented or not implemented during or prior to interactive gameplay. For example, for a certain type of client computing platform, light source 203 may provide lighting on a surface of object 205 that faces viewpoint 210d as if light source 203 is a static light source. For example, for a higher-end client computing platform, light source 203 may provide dynamic lighting on a surface of object 205 that faces viewpoint 210d. For example, for a low-end client computing platform, light source 203 may provide no lighting on object 205.

Light source 204 is not included in viewing area 211d. Depending on the type of client computing platform used, one or more particular illumination effects due to light source 204 may be supported or not supported, and if supported, implemented or not implemented during or prior to interactive gameplay. For example, for a certain type of client computing platform, light source 204 may provide lighting on object 206 and/or object 205 as if light source 204 is a static light source. For example, for a higher-end client computing platform, light source 204 may provide dynamic lighting on object 206 and/or object 205. In some implementations, whether lighting is provided may depend on various factors, including but not limited to the distance between an object and light source 204. For a low-end client computing platform, light source 204 may provide no lighting on object 206 and/or object 205.

Light source 202 is included in viewing area 211d. In higher-end client computing platforms, light source 202 may provide indirect lighting on a particular surface of object 206 within viewing area 211, as light reflects from object 205. In lower-end client computing platforms, the same type of indirect lighting may be approximated and/or mimicked, e.g. by including particular information in a light map. In some implementations, a level low-end platform may entirely omit this particular type of lighting.

Referring to FIG. 1, sets of lighting information may be stored in electronic storage 118. For example, lighting preprocessing component 21 may be configured to store information in electronic storage 118. Components of system 100 may obtain, retrieve, and/or otherwise access the set of lighting information to implement and/or determine lighting, in particular during interactive (multi-user) gameplay.

Support component 22 may be configured to obtain and/or determine lighting techniques and/or lighting features that are supported by a particular client computing platform. In some implementations, support component 22 may be configured to obtain and/or determine lighting techniques and/or lighting features that are supported by a particular type of client computing platform (e.g., the latest version of iPhone™) Support component 22 may be configured to determine sets of supported lighting techniques and/or lighting features. For example, support component 22 may be configured to determine a primary set of lighting techniques and/or lighting features that are supported during interactive gameplay on a particular client computing platform. For example, support component 22 may be configured to determine a secondary set of lighting techniques and/or lighting features that are supported prior to interactive gameplay on a particular client computing platform (but, e.g., that are not supported during interactive gameplay). For example, support component 22 may be configured to determine a set of lighting techniques and/or lighting features that are not supported in any way on a particular client computing platform (which may be referred to as a tertiary set).

Selection component 23 may be configured to select sets of lighting information for client computing platforms. For example, selection component 23 may be configured to analyze and/or compare lighting techniques and/or lighting features that are supported by a particular client computing platform (e.g. as obtained and/or determined by support component 22). In some implementations, selection component 23 may be configured to analyze and/or compare lighting techniques and/or lighting features that are supported by a particular type of client computing platform (e.g. as obtained and/or determined by support component 22).

Selection component 23 may be configured to select at least one set of lighting information that has been determined and/or generated by lighting pre-processing component 21. In other words, selection component 23 may be configured to determine which set of lighting information is most suitable for a particular client computing platform and/or a particular type of client computing platform. In some implementations, selection by selection component 23 may be based on an analysis and/or comparison of a primary set of lighting techniques and/or lighting features. In some implementations, selection by selection component 23 may be based on an analysis and/or comparison of a secondary set of lighting techniques and/or lighting features. In some implementations, selection by selection component 23 may be based on an analysis and/or comparison of a primary set and a secondary set of lighting techniques and/or lighting features.

Runtime lighting component 24 may be configured to determine, provide, implement, and/or effectuate lighting. For example, runtime lighting component 24 may be configured to determine lighting of objects in the virtual space. For example, runtime lighting component 24 may be configured to determine lighting of objects in a three-dimensional volume. In particular, runtime lighting component 24 may determine lighting for a particular client computing platform. In some implementations, runtime lighting component 24 may be configured to determine lighting during interactive gameplay (in particular interactive multi-user gameplay). In some implementations, runtime lighting component 24 may operate in conjunction with space component 20. In some implementations, runtime lighting component 24 may be configured to determine lighting in accordance with one or more sets of lighting information that have been selected by selection component 23. In some implementations, runtime lighting component 24 may be configured to determine lighting in accordance with one or more sets of lighting techniques and/or lighting features that have been selected by selection component 23. For example, runtime lighting component 24 may be configured to determine lighting based on a primary set of lighting techniques and/or lighting features. Alternatively, and/or simultaneously, runtime lighting component 24 may be configured to determine lighting based on a secondary set of lighting techniques and/or lighting features. Runtime lighting component 24 may be configured to obtain and/or otherwise access sets of lighting information from electronic storage 118. In particular, runtime lighting component 24 may obtain and/or access the one or more sets of lighting information that have been selected by selection component 23.

Server 15, client computing platforms 13, and/or external resources 14 may be operatively linked via one or more electronic communication links. For example, such electronic communication links may be established, at least in part, via a network 120 such as the Internet and/or other networks. It will be appreciated that this is not intended to be limiting, and that the scope of this disclosure includes implementations in which servers 15, client computing platforms 13, and/or external resources 14 may be operatively linked via some other communication media.

A given client computing platform 13 may include one or more processors configured to execute computer program components. The computer program components may be configured to enable an expert or user associated with the given client computing platform 13 to interface with system 100 and/or external resources 14, and/or provide other functionality attributed herein to client computing platforms 13. By way of non-limiting example, the given client computing platform 13 may include one or more of a desktop computer, a laptop computer, a handheld computer, a tablet computing platform, a NetBook, a Smartphone, a gaming console, and/or other computing platforms.

External resources 14 may include sources of information, hosts and/or providers of virtual environments outside of system 100, external entities participating with system 100, and/or other resources. In some implementations, some or all of the functionality attributed herein to external resources 14 may be provided by resources included in system 100.

Server 15 may include electronic storage 118, one or more processors 104, and/or other components. Server 15 may include communication lines, or ports to enable the exchange of information with network 120 and/or other computing platforms. Illustration of server 15 in FIG. 1 is not intended to be limiting. Server 15 may include a plurality of hardware, software, and/or firmware components operating together to provide the functionality attributed herein to server 15. For example, server 15 may be implemented by a cloud of computing platforms operating together as server 15.

Electronic storage 118 may comprise non-transitory storage media that electronically stores information. The electronic storage media of electronic storage 118 may include one or both of system storage that is provided integrally (i.e., substantially non-removable) with server 15 and/or removable storage that is removably connectable to server 15 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 104, information received from server 15, information received from client computing platforms 13, and/or other information that enables server 15 to function as described herein.

Processor(s) 104 is configured to provide information processing capabilities in system 100. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include a plurality of processing units. These processing units may be physically located within the same device, or processor 104 may represent processing functionality of a plurality of devices operating in coordination. The processor 104 may be configured to execute components 20-24 and/or other components. Processor 104 may be configured to execute components 20-24 and/or other components by software; hardware; firmware; some combination of software, hardware, and/or firmware; and/or other mechanisms for configuring processing capabilities on processor 104. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 20-24 are illustrated in FIG. 1 as being implemented within a single processing unit, in implementations in which processor 104 includes multiple processing units, one or more of components 20-24 may be implemented remotely from the other components. The description of the functionality provided by the different components 20-24 described below is for illustrative purposes, and is not intended to be limiting, as any of components 20-24 may provide more or less functionality than is described. For example, one or more of components 20-24 may be eliminated, and some or all of its functionality may be provided by other ones of components 20-24. As another example, processor 104 may be configured to execute one or more additional components that may perform some or all of the functionality attributed below to one of components 20-24.

Figure 3:
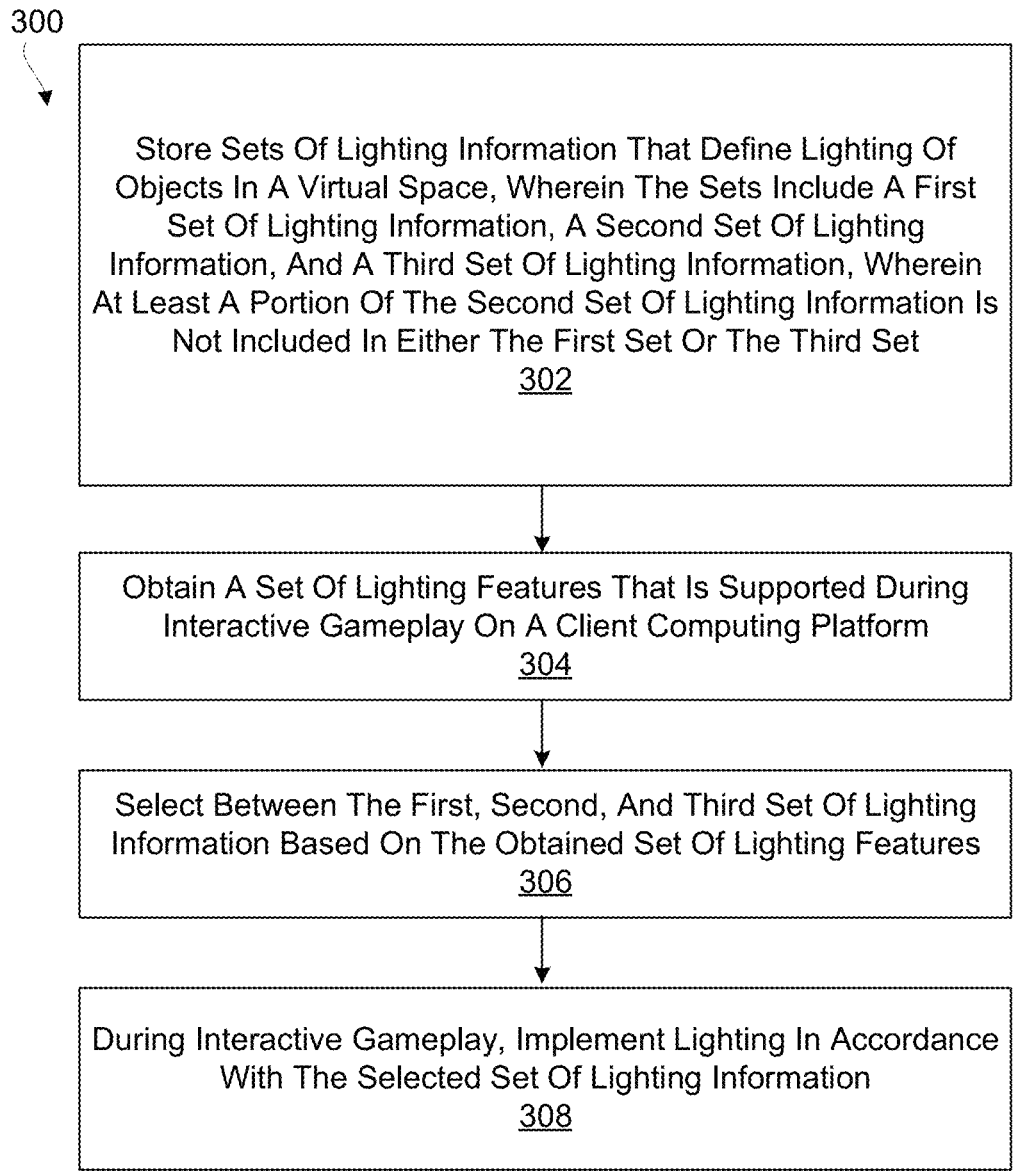
FIG. 3 illustrates one exemplary method of facilitating lighting of objects during interactive gameplay, in accordance with one or more implementations.

FIG. 3 illustrates one exemplary method of facilitating lighting of objects during interactive gameplay. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, at least a portion of the sets of lighting information are stored on electronic storage. The sets define lighting by one or more light sources of objects in a virtual space, e.g. in a multi-dimensional volume. The sets include a first set of lighting information, a second set of lighting information, and a third set of lighting information. The first set of lighting information defines lighting in accordance with an implementation during interactive gameplay for (i) indirect lighting by at least one of the one or more light sources on at least one of the objects, and (ii) deferred lighting by at least one of the one or more light sources on at least one of the objects. The second set of lighting information defines lighting in accordance with a combination of implementation during interactive gameplay and implementation prior to interactive gameplay of the indirect lighting and the deferred lighting such that at least one of the indirect lighting and the deferred lighting is implemented during interactive gameplay. The third set of lighting information defines lighting in accordance with no implementation during interactive gameplay for the indirect lighting and the deferred lighting such that either one of the indirect lighting and the deferred lighting is omitted or implemented prior to interactive gameplay. At least a portion of the second set of lighting information that defines lighting in accordance with implementation during interactive gameplay is not included in the third set of lighting information. At least a portion of the second set of lighting information is not included in either the first set or the third set. In some embodiments, operation 302 is performed by a lighting preprocessing component the same as or similar to lighting preprocessing component 21 (shown in FIG. 1 and described herein).

At an operation 304, a set of lighting features is obtained that is supported during interactive gameplay on a client computing platform. In some embodiments, operation 304 is performed by a support component the same as or similar to support component 22 (shown in FIG. 1 and described herein).

At an operation 306, a selection is made between the first, second, and third set of lighting information based on the obtained set of lighting features. In some embodiments, operation 306 is performed by a selection component the same as or similar to selection component 23 (shown in FIG. 1 and described herein).

At an operation 308, during interactive gameplay, lighting in the multi-dimensional volume is implemented in accordance with the selected set of lighting information. In some embodiments, operation 308 is performed by a runtime lighting component the same as or similar to runtime lighting component 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate illumination of objects during interactive gameplay by users on client computing platforms, wherein the client computing platforms include a first client computing platform and a second client computing platform, wherein the first client computing platform has a first available performance, wherein the first available performance pertains to one or more of computing power, graphics performance, memory speed, and/or bandwidth, wherein the second client computing platform has a second available performance, wherein the second available performance pertains to one or more of computing power, graphics performance, memory speed, and/or bandwidth, the system comprising:

electronic storage configured to store sets of lighting information that defines lighting by one or more light sources of objects in a multi-dimensional volume in a virtual space, wherein the sets include a first set of lighting information, a second set of lighting information, and a third set of lighting information, wherein the first set of lighting information defines a first lighting of the objects in accordance with a first implementation during interactive gameplay for (i) indirect lighting by at least one of the one or more light sources on at least one of the objects, and (ii) deferred lighting by at least one of the one or more light sources on at least one of the objects, wherein the second set of lighting information defines a second lighting of the objects in accordance with a combination of implementation during interactive gameplay and a second implementation prior to interactive gameplay such that at least one of the indirect lighting and the deferred lighting is implemented during interactive gameplay and further such that, in the second implementation, at least one of the indirect lighting and the deferred lighting is implemented using a pre-processed light map that is reused between different frames, wherein the third set of lighting information defines a third lighting of the objects in accordance with no implementation during interactive gameplay for the indirect lighting and the deferred lighting such that either one of the indirect lighting and the deferred lighting is implemented in a particular light map prior to interactive gameplay, wherein the particular light map includes one or more baked-in shadows;

wherein at least a portion of the second set of lighting information that defines the second lighting of the objects during interactive gameplay is not included in the third set of lighting information;

wherein at least a portion of the second set of lighting information is not included in either the first set or the third set;

one or more physical processors configured by machine-readable instructions to:

determine, by a support component, a first set of lighting features that is supported by the first client computing platform during interactive gameplay on the first client computing platform;

determine, by the support component, a second set of lighting features that is supported by the second client computing platform during interactive gameplay on the second client computing platform;

make a first selection, for the first client computing platform, between the first, second, and third set of lighting information based on the determined first set of lighting features;

make a second selection, for the second client computing platform, between the first, second, and third set of lighting information based on the determined second set of lighting features;

during interactive gameplay on the first client computing platform, implement the illumination of the objects in the multi-dimensional volume in accordance with the first selection; and during interactive gameplay on the second client computing platform, implement the illumination of the objects in the multi-dimensional volume in accordance with the second selection, wherein the second selection is different from the first selection.

2. The system of claim 1, wherein the indirect lighting on the at least one of the objects includes reflected light from the at least one or the one or more light sources.

3. The system of claim 1, wherein the deferred lighting contributes to less than 20% of the objects in the multi-dimensional volume.

4. The system of claim 1, wherein the deferred lighting originates from a dynamic light source such that the deferred lighting needs to be determined on a frame-by-frame basis.

5. The system of claim 1, wherein the one or more processors are further configured to:

determine and store, prior to interactive gameplay, differences between the first set of lighting information and the second set of lighting information, wherein, during the interactive gameplay, and responsive to selection of the second set of lighting information, implementation of the illumination of the objects in the multi-dimensional volume is further based on the differences.

6. The system of claim 1, wherein the one or more processors are further configured to:

determine and store, prior to interactive gameplay, differences between the first set of lighting information and the third set of lighting information, wherein, during the interactive gameplay, and responsive to selection of the third set of lighting information, implementation of the illumination of the objects in the multi-dimensional volume is further based on the differences.

7. The system of claim 1, wherein determining the first set of lighting features that is supported is performed by the first client computing platform.

8. The system of claim 1, wherein determining the first set of lighting features that is supported is performed by the system and not on the first client computing platform.

9. The system of claim 1, wherein selection between the first, second, and third set of lighting information is performed by the system and not on the first client computing platform.

10. A computer-implemented method of facilitating illumination of objects during interactive gameplay by users on client computing platforms, wherein the client computing platforms include a first client computing platform and a second client computing platform, wherein the first client computing platform has a first available performance, wherein the first available performance pertains to one or more of computing power, graphics performance, memory speed, and/or bandwidth, wherein the second client computing platform has a second available performance, wherein the second available performance pertains to one or more of computing power, graphics performance, memory speed, and/or bandwidth, the method being implemented in a system that includes electronic storage and one or more physical processors configured by machine-readable instructions, the method comprising:

storing, on the electronic storage, sets of lighting information that define lighting by one or more light sources of objects in a multi-dimensional volume in a virtual space, wherein the sets include a first set of lighting information, a second set of lighting information, and a third set of lighting information, wherein the first set of lighting information defines a first lighting of the objects in accordance with a first implementation during interactive gameplay for (i) indirect lighting by at least one of the one or more light sources on at least one of the objects, and (ii) deferred lighting by at least one of the one or more light sources on at least one of the objects, wherein the second set of lighting information defines a second lighting of the objects in accordance with a combination of implementation during interactive gameplay and a second implementation prior to interactive gameplay such that at least one of the indirect lighting and the deferred lighting is implemented during interactive gameplay and further such that, in the second implementation, at least one of the indirect lighting and the deferred lighting is implemented using a pre-processed light map that is reused between different frames, wherein the third set of lighting information defines a third lighting of the objects in accordance with no implementation during interactive gameplay for the indirect lighting and the deferred lighting such that either one of the indirect lighting and the deferred lighting is implemented in a particular light map prior to interactive gameplay, wherein the particular light map includes one or more baked-in shadows, wherein at least a portion of the second set of lighting information that defines the second lighting of the objects during interactive gameplay is not included in the third set of lighting information, and wherein at least a portion of the second set of lighting information is not included in either the first set or the third set;

determining a first set of lighting features that is supported by the first client computing platform during interactive gameplay on the first client computing platform;

determining a second set of lighting features that is supported by the second client computing platform during interactive gameplay on the second client computing platform;

making a first selection, for the first client computing platform, between the first, second, and third set of lighting information based on the determined first set of lighting features;

making a second selection, for the second client computing platform, between the first, second, and third set of lighting information based on the determined second set of lighting features;

during interactive gameplay on the first client computing platform, implementing the illumination of the objects in accordance with the first selection; and during interactive gameplay on the second client computing platform, implementing the illumination of the objects in the multi-dimensional volume in accordance with the second selection, wherein the second selection is different from the first selection.

11. The method of claim 10, wherein the indirect lighting on the at least one of the objects includes reflected light from the at least one or the one or more light sources.

12. The method of claim 10, wherein the deferred lighting contributes to less than 20% of the objects in the multi-dimensional volume.

13. The method of claim 10, wherein the deferred lighting originates from a dynamic light source such that the deferred lighting needs to be determined on a frame-by-frame basis.

14. The method of claim 10, further comprising:

determining and storing, prior to interactive gameplay, differences between the first set of lighting information and the second set of lighting information, and wherein, during the interactive gameplay, and responsive to selecting the second set of lighting information, implementing the illumination of the objects in the multi-dimensional volume is further based on the differences.

15. The method of claim 10, further comprising:

determining and storing, prior to interactive gameplay, differences between the first set of lighting information and the third set of lighting information, wherein, during the interactive gameplay, and responsive to selecting the third set of lighting information, determining the illumination of the objects in the multi-dimensional volume is further based on the differences.

16. The method of claim 10, wherein determining the first set of lighting features that is supported is performed by the first client computing platform.

17. The method of claim 10, wherein determining the first set of lighting features that is supported is performed by the system and not on the first client computing platform.

18. A system configured to facilitate illumination of objects during interactive gameplay by users on client computing platforms, wherein the client computing platforms include a first client computing platform and a second client computing platform, wherein the first client computing platform has a first level of available performance, the first level of available performance being based on a first set of intrinsic parameters of the first client computing platform including one or more of computing power, graphics performance, memory speed, and/or bandwidth, wherein the second client computing platform has a second level of available performance, the second level of available performance being based on a second set of intrinsic parameters of the second client computing platform including one or more of computing power, graphics performance, memory speed, and/or bandwidth, the system comprising:

electronic storage configured to store sets of lighting information that defines lighting by one or more light sources of objects in a multi-dimensional volume in a virtual space, wherein the sets include a first set of lighting information, a second set of lighting information, and a third set of lighting information, wherein the first set of lighting information defines a first lighting of the objects in accordance with an implementation during interactive gameplay for
  (i) indirect lighting by at least one of the one or more light sources on at least one of the objects, and
  (ii) deferred lighting by at least one of the one or more light sources on at least one of the objects, wherein the second set of lighting information defines a second lighting of the objects in accordance with a combination of implementation during interactive gameplay and implementation prior to interactive gameplay such that at least one of the indirect lighting and the deferred lighting is implemented during interactive gameplay and further such that at least one of the indirect lighting and the deferred lighting is implemented using a pre-processed light map that is reused between different frames, wherein the third set of lighting information defines a third lighting of the objects in accordance with no implementation during interactive gameplay for the indirect lighting and the deferred lighting such that either one of the indirect lighting and the deferred lighting is implemented prior to interactive gameplay;

wherein at least a portion of the second set of lighting information that defines the second lighting of the objects during interactive gameplay is not included in the third set of lighting information;

wherein at least a portion of the second set of lighting information is not included in either the first set or the third set; and one or more physical processors configured by machine-readable instructions to:

determine, by a support component, a first set of lighting features that is supported by the first client computing platform during interactive gameplay on the first client computing platform;

determine, by the support component, a second set of lighting features that is supported by the second client computing platform during interactive gameplay on the second client computing platform;

make a first selection, for the first client computing platform, between the first, second, and third set of lighting information based on the determined first set of lighting features;

make a second selection, for the second client computing platform, between the first, second, and third set of lighting information based on the determined second set of lighting features;

during interactive gameplay on the first client computing platform, implement the illumination of the objects in the multi-dimensional volume in accordance with the first selection; and during interactive gameplay on the second client computing platform, implement the illumination of the objects in the multi-dimensional volume in accordance with the second selection, wherein the second selection is different from the first selection.

\* \* \* \* \*